INVENTOR.
C. E. ALLEMAN

United States Patent Office 3,690,816
Patented Sept. 12, 1972

3,690,816
SIMPLIFIED GAS OR LIQUID TREATING
AND/OR DEHYDRATION PROCESS
Carl E. Alleman, c/o Phillips Petroleum Co.,
Bartlesville, Okla. 74003
Filed Feb. 24, 1970, Ser. No. 13,681
Int. Cl. B01d 47/00; C10g 29/20
U.S. Cl. 423—228                          4 Claims

ABSTRACT OF THE DISCLOSURE

The removal of impurities such as hydrogen sulfide, carbon dioxide, and water from a gas or liquid such as natural gas or a hydrocarbon, is accomplished by treating the gas or liquid with an absorbent liquid or reagent in a treater or an absorber, obtaining a purified gas or liquid and an enriched absorbent liquid or reagent. The absorbent liquid is passed without prior essential heating directly to the top of a stripper or regenerator wherein impurities are released with the aid of heat. Heat is supplied, for example, by reboiling the absorbent liquid in the stripper or the regenerator. The enriched liquid acts in the stripper or regenerator to condense vaporized absorbent or reagent liquid which normally would pass therefrom then to be condensed and later returned. Hot, lean absorbent liquid or reagent recovered from the stripper or regenerator is cooled by external cooling media and returned to the treatment. This cooling is the sole essential cooling of the liquid absorbent or reagent in the overall operation. In many cases this cooling is the sole essential cooling in the overall operation.

---

Figure 1:
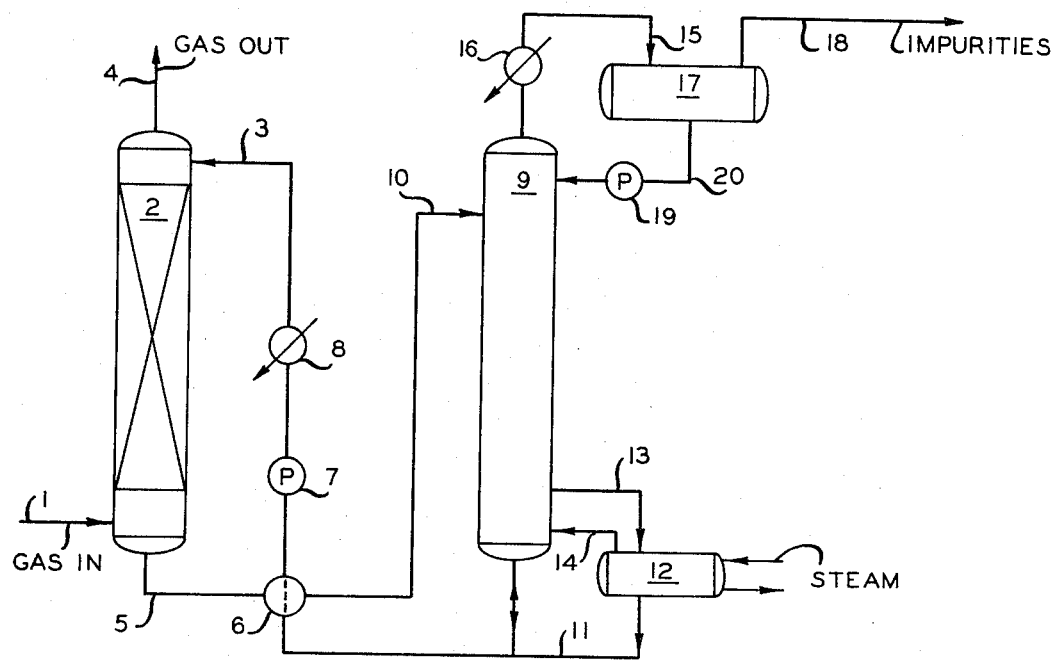

This invention relates to the removal of impurities from a gas or a liquid. In one of its aspects the invention relates to the removal of acid gas impurities, e.g., hydrogen sulfide and/or carbon dioxide, from a hydrocarbon gas, e.g., a natural gas. In another of its aspects the invention relates to the purification of a liquid, e.g., a hydrocarbon. In still another of its aspects the invention relates to a modified absorption system in which a gas or liquid is treated to remove impurities therefrom in an absorption-stripping combination operation designed to remove from said gas impurities such as hydrogen sulfide, carbon dioxide and/or water, the operation presenting a considerably simplified need for apparatus.

In one of its concepts the invention provides an operation or system for the removal of an impurity from a gas or liquid containing the same which comprises passing said gas or liquid containing said impurities into an absorption treatment in a treatment zone with an impurity absorbent liquid or reagent thus obtaining a purified gas or liquid and a rich liquid or reagent containing impurities, passing the rich liquid to a stripping or regeneration zone, in said latter zone removing impurities from said rich liquid with the aid of heat, removing impurities from said zone, also removing from said regeneration zone a hot, lean liquid or reagent, cooling said lean liquid or reagent and passing the cooled liquid or reagent into said treatment zone as said impurity absorbing liquid or reagent, the cooling of the lean impurity absorbing liquid being the sole essential cooling of the absorbent liquid or reagent in the operation.

In another of its concepts the invention provides an absorber-stripping system wherein impurity-containing gas is contacted with an absorbent liquid or selective solvent in an absorption zone, the enriched liquid or solvent is passed to the top of a stripping zone which is reboiled to therein disengage from the liquid the impurities which are taken overhead, thus to recover a hot, lean liquid bottoms, the lean liquid bottoms are cooled and returned to the absorber, the introduction of the rich absorbent liquid into the top of the stripper being the sole essential cooling practiced in connection with operation of the stripper, the cooling of the recovered lean absorbent after its recovery from the stripping zone being the sole essential cooling practiced in the overall absorption-desorption operation.

In a further concept the invention provides a simplified apparatus in which only one cooling section for cooling hot, regenerated solvent or reagent is needed and which does not require any regenerator overhead cooler, condenser, reflux drum, pump, valves, piping and attendant controls.

Various operations for the recovery of hydrogen sulfide and/or carbon dioxide substantially free from hydrocarbons and substantially pure hydrocarbons by chemical treating or selective solvent treatment of an impure hydrocarbon stream are known. U.S. Pat. 2,860,030. Walter A. Goldtrap et al., Nov. 11, 1958, describes such processes or methods using amines. The regenerative caustic system treatment of hydrocarbons, which is common in the industry for removing mercaptans, is patterned after the process for amines.

In the known absorption operations the enriched absorbent or solvent, after removal from the absorber tower, is heated in one way or another prior to its introduction into the stripper. The top of the stripper tower is maintained at a temperature such that there passes out as overhead, unavoidably, together with the gaseous impurities stripped from the hot reagent or absorbent liquid, a substantial portion of the absorbent in vaporous form. Then, according to the prior art, cooling of the overhead is practiced for separation of the impurities in gaseous or vaporous form and to condense the absorbent, which has passed out from the stripper as overhead, so that it can be returned to the stripper, ordinarily as reflux therefor. Thus, in the usual stripper system, the total heat input to the system will be by way of the heating of the stripper bottom and the total cooling will be by way of cooling the stripper overhead to condense the absorbent passing out in the overhead so that it can be returned to the stripper. In the more complex operations, as shown in the above-identified patent, there may be intermediate heating in intermediate towers or flash tanks. It will be recognized at once that such intermediate towers or tanks are part of the stripping operation. Accordingly, the immediately preceding statement regarding heat input and cooling obtains in such systems also. All these practices have continued throughout their history with only slight modifications from the original U.S. Pat. 1,783,901.

Thus, considering heat transfer in a complete absorption-desorption system, as herein discussed, it is possible to view the entire system as a box. The only major heat entering is that of the steam or other heating medium used to reboil the rich absorbent or reagent to permit obtaining the same in regenerated condition for reuse. The only major heat removed from the box is that leaving with the cooling water, assuming for a moment that all cooling is done with water. Of course, some cooling can be done with other cooling media, such as air. Suffice to say that any intermediate heat exchangers, for example, an exchanger in which indirect heat exchange is obtained between enriched absorbent or reagent liquid and hot, lean absorbent or reagent liquid, does not introduce nor does it remove heat from the overall system.

I have now conceived a flow diagram and operation for a simplified system, such as an amine system, for the usual application to the treatment of a hydrocarbon gas such as natural gas in which there is substituted heat exchange by gas/liquid contacting for the heat exchange now practiced in the usual enriched absorbent or reagent/ hot, lean absorbent or reagent exchanger. Although this substitution may require from 1 to, say, 5 additional trays in the top of the regenerator or stripper, it will permit the following considerable eliminations or economies in the usual amine system:

(1) Elimination of the rich absorbent or reagent/hot, lean absorbent or reagent heat exchanger.

(2) Elimination of the overhead cooler-condenser, reflux drum, reflux pump and its attendant instruments and piping, ordinarily constructed and used with the conventional stripper or regenerator.

(3) Combining of the heat transfer capacity ordinarily provided by the reflux condenser, its cooler, etc. into the hot, lean absorbent liquid cooler, thus requiring only one installation instead of several.

(4) A considerable decrease in difficulties ordinarily encountered with corrosion and also sometimes with freezing.

(5) The total heat exchange surface area ordinarily required heretofore is decreased by more than 50 percent, resulting in a decrease of about 10 to 19 percent of the system's overall cost.

The simplification and economies obtained according to my concepts are offered for the first time in an industry which has for 35 years widely exploited amine-treating of hydrocarbon gases for removal of hydrogen sulfide, carbon dioxide, water and other impurities and in which the cooling-condensing and refluxing with the condensed treating agent has been practiced.

Thus, I have conceived that the heating required to be accomplished in the enriched absorbent or reagent to the temperature at which it normally is introduced into the stripper or regenerator can be accomplished in the top of the stripper or regenerator, economically, even if one or more or additional trays needs to be added thereto and, of course, that this heating can be done in the stripper column or regenerator by direct vapor/liquid contacting on the trays. Thus, all of the heating of the enriched absorbent to regenerate the same is accomplished on the trays in the regenerator or stripper rather than just a part of it.

It is an object of this invention to provide a gas or liquid treating or purification operation. It is another object of this invention to provide a simplified gas or liquid purification treatment apparatus. It is a further object of this invention to provide a simplified operation for the purification of a gas, such as hydrocarbon gas, to remove therefrom an impurity such as hydrogen sulfide, carbon dioxide and/or water. It is a still further object of this invention to provide a gas treating operation necessitating only a considerably reduced number of operations and amount of equipment with concomitant advantages such as reduction of losses due to corrosion, reduction of cost of upkeep and, importantly, reduction of cost of construction of apparatus. Still another object of the invention is to provide an improved, less costly hydrocarbon purification treatment, e.g., regenerative amine treatment or regenerative caustic treatment to remove impurities from the hydrocarbon.

Other aspects, concepts, and objects of the invention, as well as its several advantages, are apparent from a study of this disclosure, the drawings and the appended claims.

According to the present invention there is provided a gas or liquid medium treating operation wherein the enriched reagent or absorption liquid used to treat the impure medium is passed directly into the top portion of a stripper or regenerator to there be heated and to act as reflux to condense rising absorbent or reagent liquid vapors and wherein the sole essential cooling of the absorbent or reagent liquid in the overall operation is practiced upon the hot, lean absorbent or reagent recovered from the stripper or regenerator which is heated according to prior art practice. More specifically, the invention provides an apparatus comprising a treater or absorber and a regenerator, piping to conduct an impure gas or liquid into the treater or absorber and piping to remove purified gas or liquid therefrom, piping to convey enriched treating liquid into the top of the regenerator, piping to remove gaseous or vaporous impurities from the top of the regenerator, piping to supply heat to the regenerator, piping to remove hot, lean treating liquid from the regenerator, cooling means for cooling hot, lean treating liquid and piping to conduct cool, lean treating liquid to the treater, there being no need for use of a heat exchanger to remove heat from the hot, lean treating liquid and add it to the enriched treating liquid, and in many cases there being no need for a cooler, condenser, reflux drum, reflux pump, and associated piping and control equipment normally used in the overhead piping from the regenerator.

My invention has general applicability. It is of particular interest presently with respect to amine, e.g., monoethanolamine solution, treating systems of which a great many are in use as in the treatment of natural gas or hydrocarbon liquids to remove acid gas impurities therefrom. It is also applicable to regenerative caustic systems for treating hydrocarbons, whether these be in gaseous or liquid form.

Thus, the invention is applicable to a system which has the following four characteristics:

(1) A circulating liquid which is being heated and cooled.

(2) Part of the heating is accomplished in a liquid-vapor contacting column.

(3) The remaining part of the heating is accomplished by indirect heat exchange with the hot liquid.

(4) Part of the overall cooling, i.e., heat rejection for the total system, is accomplished ordinarily in the overhead vapors emanating from the contacting column.

It will be understood by one skilled in the art in possession of this disclosure, having studied the same, that there are known various absorbents or reagents suited to the removal of impurities from hydrocarbon gases and liquids. Further in considering the description of the drawings made herein, the valves, instruments and other equipment ordinarily associated with a treatment as herein described have been omitted for sake of simplicity.

Figure 2:
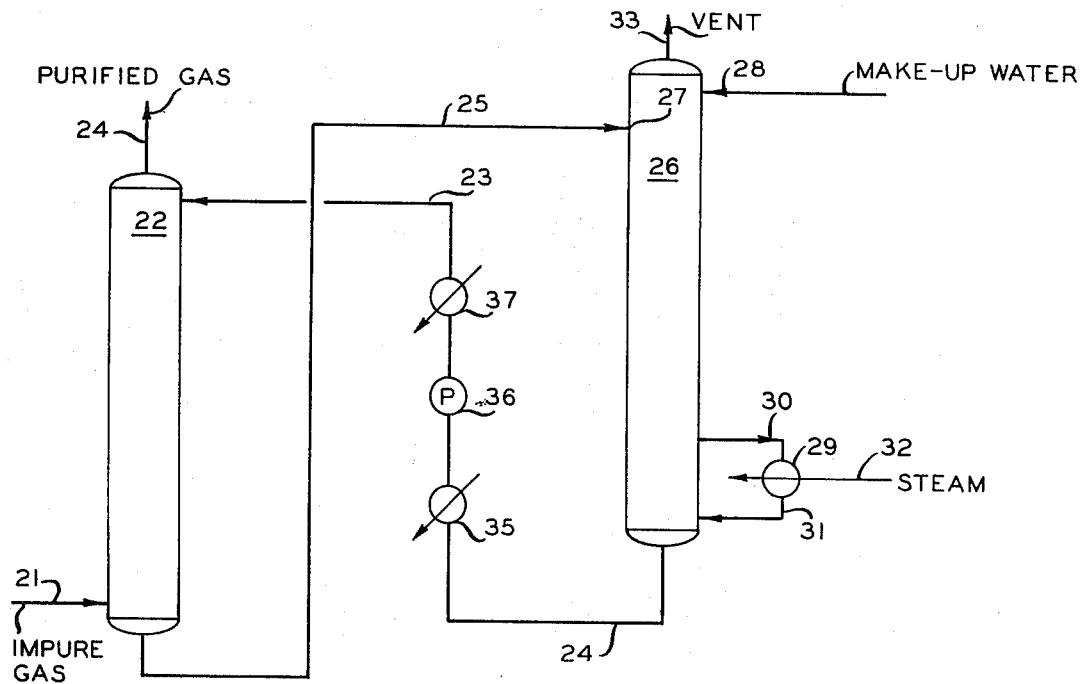

Referring now to the drawings, FIG. 1 is a diagrammatic illustration of a conventional gas treating system with the usual hot, lean amine-cold rich amine heat exchanger intermediate the absorber and the stripper as well as the condenser, reflux drum and associated equipment operated in conjunction with the stripper to condense and to return stripper overhead. FIG. 2 is a diagrammatic showing of the system of the invention in which the heat exchanger intermediate the absorber and the stripper has been eliminated along with the condenser, reflux drum and associated equipment seen in FIG. 1.

Referring now to FIG. 1 of the drawings, the gas to be purified is passed by 1 into absorber 2 in which it is contacted by cool, lean aqueous monoethanolamine fed to the top of the absorber by 3. Purified gas leaves the absorber by 4. Rich absorbent solution is removed from the absorber at 5 and passed through heat exchanger 6 in which it is heat exchanged with hot stripped or lean, absorbent cooling the latter which is then passed by pump 7 and cooler 8 and 3 into absorber 2. The now preheated rich absorbent enters stripper 9 by 10 to produce hot, lean absorbent solution which is removed by 11 and passed to heat exchanger 6, surge being provided in the bottom section of 9 to benefit pump 7 which returns the lean absorbent through cooler 8 to absorber 2. The bottom of the stripper is reboiled by reboiler 12 into which the stripper bottoms are passed by 13 and from which stripping vapors are returned to the stripper by 14. Overhead from stripper 9 is passed by 15 through condenser 16 into reflux drum 17. Impurities are removed from reflux drum 17 by 18 while reflux from drum 17 is pumped by 19 and 20 to stripper 9.

Referring now to FIG. 2 of the drawing, according to the invention, gas to be purified, as by contact with aqueous monoethanolamine, is fed by 21 to absorber 22 into which at its upper portion there is introduced by 23 a relatively cool, lean aqueous monoethanolamine solution. The impure gas flows in countercurrent fashion with the monoethanolamine solution and during this contact is purified, leaving the absorber 22 by 24. Rich solution is removed from 22 by 25 and passed into stripper 26 into the upper portion thereof at 27 just above and onto a tray as shown diagrammatically. Water makeup is fed by 28 to a tray above the level 27. In the stripper, which is reboiled at its bottom by reboiler 29 and associated piping 30 and 31 and steam supply 32, the rich solution is stripped of the impurities which travel upwardly through the plates bathed in reflux and emerge above the water makeup through 33 while denuded solution is recovered at 24. The recovered solution is passed through the sole cooling operation in the system, passing through air cooled cooler 35, pump 36 and water cooler 37 and 23 into the absorber 22, thus completing its cycle.

Returning to the stripper, it may be considered as composed of a conventional, or unmodified section containing the conventional number of trays and an added section containing additional trays above the conventional section. The added trays will be sufficient in number to bring the downflowing added water and rich solution to the usual temperature for the top of the conventional section through contact on the added trays with upflowing vapors.

Thus, if the stripper top temperature prior to modification is 209° F., then the trays above the level at which 209° F. obtains will be in a number sufficient to allow the added water and the rich solution, as it engages the upflowing vapors in the stripper, to reach 209° F. at said level. Thus, if the usual stripper contains, say, 20 trays and the top tray is at 209° F. therein, the invention provides a number of trays above the 20th tray to permit a temperature of 209° F. at the 20th tray in the modified system of the invention.

The same simplified system can be applied where an amine solution is used to remove acid gas impurities from a liquid hydrocarbon by liquid-liquid extraction. In this case all the heat exchange and regeneration portions of the overall system are identical to the case where an impure gas is being treated. Thus, all the improvements described above apply equally whether gas or liquid is being purified.

In the case of a regenerative caustic treatment of a hydrocarbon liquid or gas the entire conventional operation takes the same form as it does for an amine system. In an amine system the heat duty on the lean amine/rich amine heat exchanger is approximately equal to the heat duty of the overhead condenser on the stripper. Thus, when the amine/amine exchanger is eliminated by my invention, the overhead condenser is also eliminated and its cooling duty is added to that of the usual cooler for the circulating amine. However, in the conventional regenerative caustic system the overhead condenser is many times larger than the lean caustic/rich caustic heat exchanger. Thus, when the caustic/caustic heat exchanger is eliminated by my invention the heat duty of the overhead condenser on the stripper is decreased by an amount equal to that of the former caustic/caustic heat exchanger. The capacity of the reflux equipment associated with the overhead heat condenser may also be decreased proportionately. In keeping with the principles of this invention, the duty of the caustic cooler is increased by an amount equal to the decrease in heat duty of the overhead condenser. Otherwise, the treating operation and apparatus are substantially the same when my invention is applied to either an amine system or a regenerative caustic system.

According to a substantial extent, application of my invention to other systems, e.g., a caustic regenerative system, will produce considerable savings in construction, installation and maintenance.

By way of example, the following is a calculated comparison with an existing facility at Hoag Ammonia Plant, Beatrice, Nebr.

Impure gas:

Total volume 73.5×10⁶ std. cu. ft./D.

| Component: | Mols/hr. |
|---|---|
| Nitrogen | 1586 |
| Argon | 19 |
| Hydrogen | 4879 |
| Carbon monoxide | 40 |
| Carbon dioxide | 1445 |
| Methane | 24 |
| Water | 77 |

Amine solution: 20% monoethanolamine, 80% water, 2160 gal./min.

| | Conventional | Applicant's |
|---|---|---|
| Amine/amine heat exchanger: | | |
| Heat duty—62×10⁶ B.t.u./hr. | | |
| Area—15,630 sq. ft. | | |
| Total direct and allocated cost (tubes stainless in 2 vessels, C. S. in 1) | $150,000 | 0 |
| Stripper column: 12' I.D. | (1) | (2) |
| Total allocated and direct cost | $169,200 | $192,000 |
| Overhead condenser: | | |
| Heat duty—50.7×10⁶ B.t.u./hr. | | |
| Area—5,500 sq. ft. (stainless). | | |
| Total direct and allocated cost | $60,800 | 0 |
| Condenser reflux drum: | | |
| 7' I.D. x 13' long; 140° F. and 2 p.s.i.g. | | |
| Total direct and allocated costs | $12,000 | 0 |
| Reflux pumps (2): | | |
| 101 g.p.m. at 117 ft. head; cast iron | | |
| Total direct and allocated costs | $3,000 | 0 |
| Amine cooler: | | |
| Heat duty (in MM B.t.u./hr.) | 84 | 134.7 |
| Log mean temp. diff. (in °F.) | 28.7 | 43.5 |
| Area (in sq. ft.) (new area stainless) | 19,300 | 20,900 |
| Total direct and allocated costs | $135,000 | $152,600 |
| Total involved costs | $530,000 | $344,600 |
| Savings=530,000 −338,000= | $185,400 | |
| CO² removal unit total cost | $965,000 | |
| Percent savings on entire unit | 19.2 | |

¹ 20 trays, 60' long.
² 25 trays, 70' long.

Reasonable variation and modification are possible within the scope of the foregoing disclosure, drawing and the appended claims to the invention the essence of which is that there has been provided a considerably simplified and more economical operation for the treatment of a gas or liquid, e.g., a hydrocarbon, to absorb therefrom by selective solvency or by a chemical reaction impurities into a treating solution or agent which is then regenerated by passing the same directly into a regenerator or stripper in a manner such that all of the heating of the treating solution or agent takes place in the stripper by direct contact with vapors therein, and the bottoms removed from the stripper or regenerator are cooled in a single cooling operation effected by external media prior to use for the treatment to remove the impurities and that apparatus of considerably simplified form and extent can be used.

I claim:

1. In an operation for removing an impurity such as hydrogen sulfide and carbon dioxide from an absorbent liquid medium containing an amine which has been used in countercurrent flow contact with a stream passing through an absorber column to remove said impurities from said stream, the lean liquid having been cooled prior to absorption of said impurity thereinto and then subjected following absorption to stripping in a stripping column, the bottom of the stripping column being heated and the top thereof being refluxed and cooled with a cooling medium, and the overhead stream therefrom being cooled with a cooling medium and at least partially condensed, part of the condensate being used as said reflux, the improvement which comprises extending said stripping column, above the usual level of introduction of said rich absorbent into said column, to provide a vapor-liquid contacting section for direct heat interchange between vapors rising from said level and rich absorbent liquid introduced to said column above said section for direct heat interchange between said rich liquid descending there-through and vapors rising through said section sufficient to heat said rich absorbent liquid flowing downwardly through said section when it has reached said level to the temperature conventionally existing at said level, introducing said rich absorbent liquid without preheating it into said stripping column, into the upper portion of said vapor-liquid contacting section, therein causing the downward flow of said rich absorbent liquid to regenerate the same, removing the regenerated, now lean, absorbent liquid from the stripping column, cooling said lean, absorbent liquid, said direct heat interchange being the sole essential heating of said rich absorbent liquid and said cooling of said lean, absorbent liquid being the sole essential cooling of said liquid in the operation thus avoiding or eliminating the need for any indirect heat exchange, heat exchanger for heating the rich absorbent liquid and any cooler and/or condenser at the top of said column and together therewith the specific functions of these pieces of equipment and said reflux, whereby all of the cooling of the overhead vapors conventionally accomplished in said any cooler and/or condenser is accomplished only by cooling the hot, regenerated, lean absorbent after it is removed from said stripper column as bottoms and condensing of absorbent vapors which might pass out the top of the stripper column is accomplished by the rich absorbent introduced into the said upper portion of said vapor-liquid contacting section.

2. An operation according to claim 1 wherein the absorbent medium from which the impurities are removed has been contacted with a hydrocarbon containing said impurities and said hydrocarbon is in said stream.

3. An operation according to claim 2 wherein said hydrocarbon is a natural gas or a hydrocarbon liquid.

4. An operation according to claim 1 wherein makeup water for the system is added to the top of the stripper.

References Cited

UNITED STATES PATENTS

| | | | |
|---|---|---|---|
| 2,954,272 | 9/1960 | Schaufelberger | 23—2 |
| 3,362,891 | 1/1968 | Meyers | 23—2 X |
| 2,701,750 | 2/1955 | Paulsen et al. | 23—2 |
| 1,934,472 | 11/1933 | Allen et al. | 23—2 X |
| 2,220,138 | 11/1940 | Wood | 23—2 X |
| 1,834,016 | 1/1931 | Bottoms | 23—2 A |
| 3,563,695 | 2/1971 | Benson | 23—2 R |

FOREIGN PATENTS

| | | | |
|---|---|---|---|
| 870,895 | 6/1961 | Great Britain | 23—2 |

EARL C. THOMAS, Primary Examiner

U.S. Cl. X.R.

208—207, 236, 289, 331

UNITED STATES PATENT OFFICE

CERTIFICATE OF CORRECTION

Patent No. 3,690,816                                    Dated: September 12, 1972

Carl E. Alleman

It is certified that error appears in the above-identified patent and that said Letters Patent are hereby corrected as shown below:

Column 1, line 6, please insert --- Assignee: Phillips Petroleum Company ---.

Signed and sealed this 1st day of May 1973.

(SEAL)
Attest:

EDWARD M. FLETCHER, JR.                         ROBERT GOTTSCHALK
Attesting Officer                               Commissioner of Patents